United States Patent [19]

Isobe et al.

[11] 4,419,406

[45] Dec. 6, 1983

[54] MAGNETIC RECORDING MEDIUM AND PRODUCTION THEREOF

[75] Inventors: Yukihiro Isobe; Kazushi Tanaka; Masaharu Nishimatsu; Osamu Shinoura; Yuichi Kubota, all of Tokyo, Japan

[73] Assignee: TDK Electronics Co., Ltd., Tokyo, Japan

[21] Appl. No.: 362,655

[22] Filed: Mar. 29, 1982

[30] Foreign Application Priority Data

Apr. 13, 1981 [JP] Japan .................................. 56-54362

[51] Int. Cl.³ ............................................. B32B 27/00
[52] U.S. Cl. ........................................ 428/422; 242/1;
427/44; 427/128; 427/177; 428/694; 428/900
[58] Field of Search ................................ 427/127-132,
427/48, 177, 57, 44; 428/900, 694, 422; 242/1

[56] References Cited

U.S. PATENT DOCUMENTS 3,293,066 12/1966 Haines ............................ 428/900 X
4,310,599 1/1982 Akashi et al. .................. 428/900 X
4,335,183 6/1982 Hosaka ............................ 427/44 X
4,339,566 7/1982 Rosenkranz et al. ............ 427/44 X Primary Examiner—Bernard D. Pianalto
Attorney, Agent, or Firm—Oblon, Fisher, Spivak, McClelland & Maier

[57] ABSTRACT

A magnetic recording medium having a magnetic layer on one surface of a substrate and a back layer on the other surface, which is characterized by that the back layer is that formed by dispersing a filler such as carbon black, graphite, $SiO_2$, $TiO_2$, $Al_2O_3$, $Cr_2O_3$, SiC, $CeO_2$, $CaCO_3$, zinc oxide, geothite, $\alpha Fe_2O_3$, talc, kaolin, $CaSO_4$, boron nitride, Teflon powder, graphite fluoride, molybdenum disulfide, zirconia etc. In a binder containing a radiation sensitive curable resin such as acryl-modified vinyl chloride - vinyl acetate - vinyl alcohol copolymer, acryl-modified polyurethane elastomer, acryl-modified polyester resin, etc. and curing it prior to rolling. The obtained back layer is very tough and can reduce the number of dropouts.

7 Claims, 1 Drawing Figure

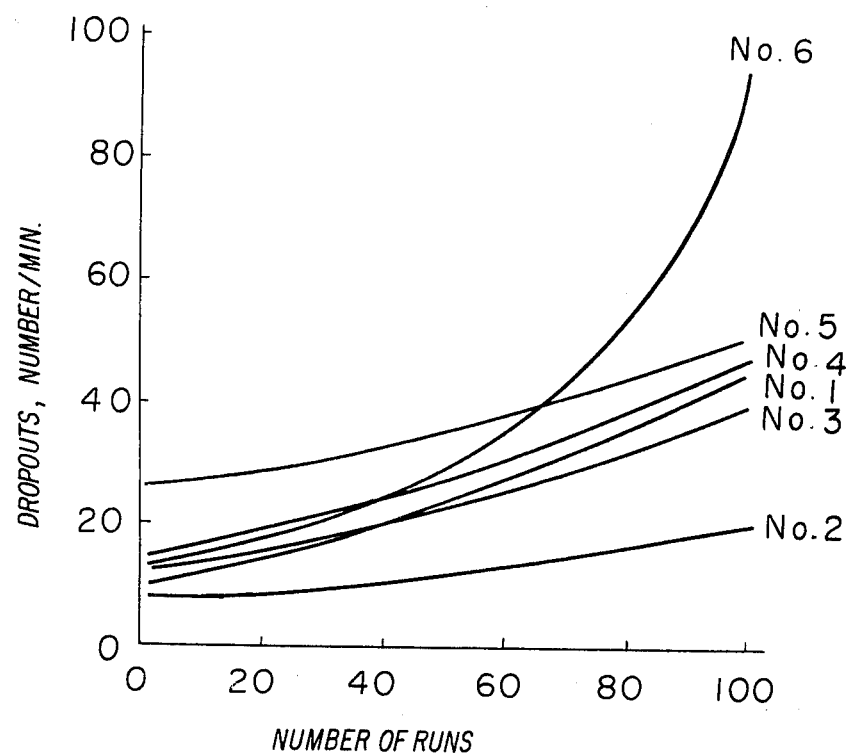

MAGNETIC RECORDING MEDIUM AND PRODUCTION THEREOF

BACKGROUND OF THE INVENTION

1. Field of the Invention

This invention relates to a magnetic recording medium and a process for production thereof.

2. Description of the Prior Art

At present, magnetic tapes have become employed extensively in audio, video and computer fields. Accordingly, the amount of information to be recorded in media has showed a yearly increase, and a higher recording density has thus been increasingly required of media.

In the current recording method utilizing a magnetic head, the spacing loss between tape—head is expressed as 54.6 d$\lambda$ [dB] (d: the tape—head distance, $\lambda$: the recording wavelength). As can be seen from this formula, in a short wavelength recording with a high recording density, the extent of the reduction in output by spacing is significantly greater than that of a longer wavelength. Therefore, if even a small foreign matter exists on the tape surface, it is inevitably detected as a dropout.

As the possible causes for dropouts, there may be contemplated the fall-off of the magnetic powder from the magnetic tape coated surface resulting from the deterioration of the coat due to repeated applications of stress, the scrape-off of the base during running, dust etc. first statically adhered to the base surface and then further transferred to the coat surface, and so forth. In order to prevent these, for example, for the latter cause, such methods were designed as that which reduces electrification of the base by coating a paint of carbon black, graphite etc. kneaded with an organic binder, or by coating an antistatic agent, or the like, that which aims to toughen the base and hence reduce the scrape-off of the base by coating a paint of silicon dioxide etc. kneaded with an organic binder, and so forth. These treatments can considerably depress the tendency of the increase in dropouts upon repeated runs. However, its level cannot be said perfectly satisfactory under the existing circumstances, and further reduction is required.

As the result of the detailed investivations into the cause for the generation of dropouts in order to further reduce them, the following have been made clear. In forming a back surface, if the back surface has been formed before the magnetic surface, then on surface smoothening by the calandering treatment subsequent to the formation of the magnetic surface, the unevenness of the back surface is transferred to the magnetic surface, and smoothening of the magnetic coat is therefore not satisfactorily achieved. For that reason, the back coat treatment is generally conducted, after a magnetic coat has been formed on a substrate, on the other side of the substrate. Since the back layer is required to be tough so that dropouts are not increased with the increase in number of runs, a thermosetting resin is generally employed as a binder. In that case, the back layer is coated, then the tape is wound up, and the thermosetting treatment is applied. However, just after the coating has been finished, a curing reaction has not started yet in the back layer and hence the coat is weak and moreover the back surface and the magnetic surface are in intimate contact with each other, the surface of the back surface coat containing carbon black, graphite or other inorganic filler filled in the back layer coat tends to be easily transferred to the opposite magnetic layer surface in intimate contact therewith; that thus transferred was found to be a cause for dropouts, plugging of the head etc. It is also presumed that a phenomenon silimar to such a phenomenon could occur with a thermoplastic resin. This accounts for that by providing a back layer, although the increase in dropouts can be depressed by repeated runs, the dropouts are not so reduced as expected in the stage of a small number of runs.

SUMMARY OF THE INVENTION

The present invention aims to eliminate the above-described drawbacks in the back layer forming step, and it reduces dropouts caused by the above, by forming a back layer using a paint obtained by kneading a radiation sensitive resin (resin curable by irradiation) as a binder with carbon black, graphite or other inorganic filler, thereafter either irradiating it with radiation from an active energy radiation source to achieve the curing treatment, or directly applying the surface treatment and then effecting the curing treatment, thereby forming a three-dimentional crosslink in the back layer to form a tough coat, and subsequently winding up the tape. According to this method, since it is after the crosslinking reaction of the coat has been completed that the tape is wound up, the intimate contact of the back layer with the magnetic layer by winding up does not cause the transfer from the back layer of the magnetic layer.

BRIEF DESCRIPTION OF THE FIGURE

FIGURE is a graph showing the relationships of the dropouts and the number of runs of the tapes of the invention and the prior art tapes.

DETAILED DESCRIPTION OF THE PREFERRED EMBODIMENTS

The radiation sensitive resin used in this invention is that which contains two or more unsaturated double bonds in the molecule chain and generates radicals by radiation to form a crosslinked structure, and this may also be obtained by modifying a thermoplastic resin to be radiation sensitive.

A specific example of the modification to be radiation sensitive is the introduction of groups which can cure by cross-linking or polymerizing on irradiation with radiation, for example, acrylic double bonds such as acrylic acid, methacrylic acid and ester compounds thereof which exhibit unsaturated double bonds having a radical polymerizability, allylic double bonds such as diallyl phthalate, unsaturated bonds of e.g. maleic acid, maleic acid derivatives etc., and the like into the molecule.

Further, other unsaturated double bonds which can be cross-linked or polymerized by irradiation with radiation may also be employed.

The thermoplastic resins which may be modified to radiation sensitive resins are described below.

(I) Vinyl chloride type copolymers

There may be illustrated vinyl chloride-vinyl acetate-vinyl alcohol copolymers, vinyl chloride-vinyl alcohol copolymers, vinyl chloride-vinyl alcohol-propionic acid copolymers, vinyl chloride-vinyl acetate-maleic acid copolymers, vinyl chloride-vinyl acetate-OH-terminated, alkyl group side-chained copolymers, for example, VROH, VYNC, VYEGX etc. by UCC and VERR by UCC, and the like.

The modification to radiation sensitive is effected by introducing acrylic double bonds, maleic acid type double bonds, allylic double bonds etc. into the above-described copolymers by the procedures described later.

(II) Saturated polyester resins

Saturated polyester resins obtained by ester bonding between saturated polybasic acids such as phthalic acid, isophthalic acid, terephthalic acid, succinic acid, adipic acid, sebacic acid etc. and polyols such as ethylene glycol, diethylene glycol, glycerin, trimethylolpropane, 1,2-propylene glycol, 1,3-butanediol, dipropylene glycol, 1,4-butanediol, 1,6-hexanediol, pentaerylthritol, sorbitol, neopentyl glycol, 1,4-cyclohexane dimethanol etc. and resins obtained by modifying these polyester resins with $SO_3Na$ etc. (e.g. Vylon 53s). These are modified to be radiation sensitive by the procedures described later.

(III) Unsaturated polyester resins

There may be illustrated polyester compounds containing radiation curable unsaturated double bonds in the molecule chain, for example, unsaturated polyester resins, prepolymers and oligomers which are the saturated polyester resins composed of ester bonds of polybasic acids and polyols as described as the thermoplastic resins in Section (II) above but a part of the polybasic acid is replaced by maleic acid.

Examples of the polybasic acid and polyol components of the saturated polyester resins include the respective compounds described in Section (I) above, and examples of the radiation curable unsaturated double bonds include maleic acid, fumaric acid etc.

For producing a radiation curable unsaturated polyester resin, maleic acid, fumaric acid or the like is added to one or more polybasic acid components and one or more polyol components and thereafter treated in conventional manner, that is, after dehydration or dealcoholization at 180°–200° C. in the presence of a catalyst under nitrogen atmosphere, the temperature is raised to 240°–280° C. and the condensation reaction is effected under reduced pressure of 0.5–1 mm Hg, thereby a polyester resin is obtained. The content of maleic acid, fumaric acid etc. is 1–40 mole %, preferably 10–30 mole %, of the total acid components depending on the degree of crosslinking on production, the radiation curability etc.

(IV) Polyvinyl alcohol type resins

Polyvinyl alcohol, butyral resins, acetal resins, formal resins, and copolymers of these components. The hydroxyl groups contained in these resins are modified to radiation sensitive by the procedures described later.

(V) Epoxy type resins and phenoxy resins

Epoxy resins obtained by the reaction of bisphenol A and epichlorohydrin, methylepichlorohydrin etc., e.g. Epikote 152, 154, 328, 1001 and 1007 by Shell Chemical, DEN 431, DER 732, DER 511 and DER 331 by Dow Chemical, EPICLON 400 and EPICLON 800 by Dai-Nippon Ink, and further phenoxy resins which are highly polymerized resins of the above epoxys, e.g. PKHA, PKHC and PKHH by UCC, copolymers of brominated bisphenol A and epichlorohydrin, e.g. EPICLON 145, 152, 153 and 1120 by Dai-Nippon Ink & Chemicals, and so forth.

The modification to be radiation sensitive is effected by utilizing the epoxy groups contained in these resins.

(VI) Cellulose derivatives

Cellulosic derivatives of various molecular weights are also effective as thermoplastic components. Inter alia, especially effective and preferred are nitrocellulose, cellulose acetate butyrate, ethylcellulose, butylcellulose, acetylcellulose etc. and the modification to be radiation sensitive is effected by utilizing the hydroxyl groups in the resins by the procedures described later.

In addition, as the resins which may be employed in the modification to be radiation sensitive, polyfunctional polyester resins, poly ether ester resins, polyvinylpyrrolidone resins and derivatives thereof (PVP olefin copolymers), polyamide resins, polyimide resins, phenol resins, spiro acetal resins, acrylic resins containing at least one acrylic or methacrylic acid ester containing a hydroxyl group as a polymerization component, etc. are also effective.

Further, by blending a thermoplastic elastomer or prepolymer into the above-described radiation sensitive-modified thermoplastic resin, an even further tough coat is obtained. Furthermore, is such a elastomer or prepolymer is similarly modified to be radiation sensitive, a better effect will be obtained. Examples of the elastomers and prepolymers which may be combined with the above-described radiation sensitive resins are illustrated below.

(I) Polyurethane elastomers, prepolymers and telomers

The use of polyurethane elastomers is particularly effective in that their abrasion resistance and adhesion to PET films are good.

Effective as such urethane compounds are polyurethane elastomers, prepolymers and telomers composed of polycondensates of various polyvalent isocyanates, as the isocyanate components, such as 2,4-toluene diisocyanate, 2,6-toluene diisocyanate, 1,3-xylene diisocyanate, 1,4-xylene diisocyanate, 1,5-naphthalene diisocyanate, m-phenylene diisocyanate, p-phenylene diisocyanate, 3,3'-dimethyl-4,4'-diphenylmethane diisocyanate, 4,4'-diphenylmethane diisocyanate, 3,3'-dimethylbiphenylene diisocyanate, 4,4'-biphenylene diisocyanate, hexamethylene diisocyanate, isophorone diisocyanate, dicyclohexylmethane diisocyanate, Desmodur L, Desmodur N etc. with various polyesters such as linear saturated polyesters (e.g. those obtained by polycondensation of polyols such as ethylene glycol, diethylene glycol, glycerin, trimethylolpropane, 1,4-butanediol, 1,6-hexanediol, pentaerythritol, sorbitol, neopentyl glycol, 1,4-cyclohexane dimethanol etc. with saturated polybasic acids such as phthalic acid, isophthalic acid, terephthalic acid, succinic acid, adipic acid, sebasic acid etc.), linear saturated poly ethers (e.g. polyethylene glycol, polypropylene glycol, polytetramethylene glycol etc), as well as caprolactum, hydroxyl containing acrylic acid esters, hydroxyl containing methacrylic acid esters etc.

While the elastomers may be directly combined with various thermoplastics modified to be radiation sensitive, it is very effective to further react them with a monomer having an acrylic double bond, allylic double bond or the like which reacts with the thermial isocyanate group or hydroxyl group in the urethane elastomer, to modify to be radiation sensitive.

(II) Acrylonitrile-butadiene copolymerized elastomers

Acrylonitrile-butadiene copolymer prepolymers containing a therminal hydroxyl group, e.g. that commercially available as Poly BD Liquid Resin from Sinclair Petrochemicals, or elastomers such as Hycar 1432 J by Nippon Zeon, etc. are particularly suitable as the elastomer components in which the double bonds in butadiene generate radicals by radiation to crosslink and polymerize.

(III) Polybutadiene elastomers

Low molecular weight prepolymers having terminal hydroxyl groups, such as Poly BD Liquid Resin R-15 by Sinclair Petrochemicals, etc. are especially suitable in view of the compatibility with thermoplastic resins. With R-15 prepolymer, since the molecule terminal is a hydroxyl group, it is possible to enhance the radiation sensitivity by adding an acrylic unsaturated double bond to the molecule terminal, and thus it is rendered more advantageous as the binder.

Further, polybutadiene cyclized products such as CBR-M901 by Japan Synthetic Rubber also exhibit excellent performance by the combination with thermoplastics. Especially, cyclized polybutadienes have good efficacy of crosslinking and polymerization due to the radicals of the unsaturated bonds inherent to the polybutadienes, and thus have excellent properties as the binders.

In addition, also suitable among other thermoplastic elastomers and their prepolymers are styrene-butadiene rubbers, chlorinated rubbers, acrylic rubbers, isoprene rubbers and their cyclized products (e.g. CIR701 by Japan Synthetic Rubber), and further epoxy modified rubbers, internally plasticized saturated linear polyesters (e.g. Vylon#300 by Toyo Spinning) etc. may also be utilized by subjecting them to the treatment to modify them to be radiation sensitive as described below.

Some examples of syntheses of radiation sensitive binders are now described.

PRODUCTION TOLYLENE DIISOCYANATE ADDUCT (a) Synthesis of an acryl-modified product of a vinyl chloride-vinyl acetate copolymeric resin (radiation sensitive-modified resin)

750 Parts of Vinylite VAGH, 1250 parts of toluene and 500 parts of cyclohexanone are charged into a 5-liter four-necked flask, dissolved by heating, and, after raising the temperature to 80° C., 61.4 parts of 2-hydroxyethyl methacrylate adduct of tolylene diisocyanate is added, followed by 0.012 part of tin octylate and 0.012 part of hydroquinone, after which the reaction is effected at 30° C. in N$_2$ stream until the rate of NCO reaction reaches 90%. After completion of the reaction, the system is cooled and diluted by adding 1250 parts of methyl ethyl ketone.

PRODUCTION OF 2-HYDROXYETHYL METHACRYLATE (2HEMA) ADDUCT OF TOLYLENE DIISOCYANATE (TDI)

348 Parts of tolylene diisocyanate is heated to 80° C. in a one-liter four-necked flask in N$_2$ stream. 260 Parts of 2-hexaethylene methacrylate, 0.07 part of tin octylate and 0.05 part of hydroquinone are added dropwise while cooling to maintain the temperature inside the reaction vessel at 80°–85° C., and after completion of the addition, stirring is effected at 80° C. for 3 houts to complete the reaction. After completion of the reaction, the contents are withdrawn and cooled to obtain 2HEMA adduct of TDI as a white paste.

(b) Synthesis of an acryl-modified product of a butyral resin (radiation sensitive-modified resin)

100 Parts of a butyral resin, BM-S produced by Sekisui Chemical is charged together with 191.2 parts of toluene and 71.4 parts of cyclohexane into a 5-liter four-necked flask, dissolved by heating, and, after raising the temperature to 80° C., 7.4 parts of 2-hydroxyethyl methacrylate adduct of tolylene diisocyanate* is added, followed by 0.015 part of tin octylate and 0.015 part of hydroquinone, after which the reaction is effected at 80° C. in N$_2$ stream until the rate of NCO reaction reaches 90% or higher. After completion of the reaction, the system is cooled and diluted with methyl ethyl ketone.

(c) Synthesis of an acryl-modified product of a saturated polyester resin (radiation sensitive-modified resin)

100 Parts of Vylon RV-200 produced by Toyo Spinning is dissolved in 116 parts of toluene and 116 parts of methyl ethyl ketone by heating, and, after raising the temperature to 80° C., 3.55 parts of 2HEMA adduct of TDI* is added, followed by 0.007 part of tin octylate and 0.007 part of hydroquinone, after which the reaction is effected at 80° C. in N$_2$ stream until the rate of NCO reaction reaches 90% or higher.

(d) Synthesis of an acryl-modified product of an epoxy resin (radiation sensitive-modified resin)

400 Parts of Epikote 1007 produced by Shell Chemical is dissolved in 50 parts of toluene and 50 parts of MEK by heating, 0.006 part of N,N-dimethylbenzylamine and 0.005 part of hydroquinone are added, the temperature is raised to 80° C., 69 parts of acrylic acid is added dropwise, and the reaction is effected at 80° C. until the acid value becomes 5 or less.

(e) Synthesis of an acryl-modified product of a urethane elastomer (radiation sensitive elastomer)

250 Parts of an isocyanate terminated diphenylmethane diisocyanate (MDI) type urethane prepolymer (Nipporan 4040 produced by Nippon Polyurethane Industry), 32.5 parts of 2HEMA, 0.07 part of hydroquinone and 0.009 part of tin octylate are placed in a reaction vessel, dissolved by heating to 80° C., and 43.5 parts of TDI is added dropwise while cooling to maintain the temperature inside the reaction vessel at 80°–90° C., after which the reaction is effected until the rate of NCO reaction reaches 95% or higher.

(f) Synthesis of an acryl-modified product of a polyether type terminated urethane-modified elastomer (radiation sensitive elastomer)

250 Parts of a polyether, PTG-500 produced by Nippon Polyurethane Industry, 32.5 parts of 2HEMA, 0.007 part of hydroquinone and 0.009 part of tin octylate are placed in a reaction vessel, dissolved by heating to 80° C., and 43.5 parts of TDI is added dropwise while cooling to maintain the temperature inside the reaction vessel at 80°–90° C., after which the reaction is effected until the rate of NCO reaction reaches 95% or higher.

(g) Synthesis of an acryl-modified product of a polybutadiene elastomer (radiation sensitive elastomer)

250 Parts of a low molecular weight hydroxyl-terminated polybutadiene, Poly BD Liquid Resin R-15 produced by Sinclair Petrochemicals, 32.5 parts of 2HEMA, 0.007 part of hydroquinone and 0.009 part of tin octylate are placed in a reaction vessel, dissolved by heating to 80° C., and 43.5 parts of TDI is added dropwise while cooling to maintain the temperature inside the reaction vessel at 80°–90° C., after which the reaction is effected until the rate of NCO reaction reaches 95% or higher.

In addition to the above modified products, there are other polymers known, i.e., those degradable by irradiation with radiation and those which take place crosslinking between molecules. Examples of those which take place crosslinking between molecules include polyethylene, polypropylene, polystyrene, polyacrylic acid esters, polyacrylamide, polyvinyl chloride, polyesters, polyprrolidone rubbers, polyvinyl alcohol, polyacrolein etc. Since any such crosslinking type polymer can take place a crosslinking reaction even if the modification as described above is not particularly conducted, it is usable as the back coat resin for crosslinking by radiation.

Furthermore, by this method, since even a non-solvent type resin which uses no solvent can cure in a short time, such a resin may also be employed as the back coat.

As the active energy radiation used for crosslinking of the back coat of this invention, electron radiation generated from a radiation accelerator, $\gamma$-rays generated from $Co^{60}$, $\beta$-rays generated from $Sr^{90}$, X-ray generated from an X-ray generator, ultra-violet light etc. may be employed.

Especially as the source for the irradiation rays, it is advantageous to employ radiation from a radiation accelerator in view of the control of the absorbed dose, the introduction into the production line, the shielding of the ionizing radiation.

As the radiation characteristics used on curing the back layer, it is convenient in view of the penetrating power to use a radiation accelerator of an acceleration voltage of 100–750 KV, preferably 150–300 KV, and irradiate so that the absorbed dose be 0.5–20 Mrad.

On curing the back layer of this invention, a radiation accelerator, such as that of a low dose type produced by Energy Science Co. in U.S.A. (Electro curtain system) etc. is extremely advantageous in view of the introduction into the tape coating process line, the shielding of secondary X-rays inside the accelerator etc.

Of course, it is also possible to use a Van de Graf type accelerator which has heretofore been widely employed.

Further, on radiation crosslinking, it is important to irradiate the back layer with radiation in an inert gas stream such as $N_2$ gas, He gas, $CO_2$ gas etc.; to irradiate in air is extremely disadvantageous because $O_3$ etc. generated by irradiation with radiation on crosslinking of the binder components inhibit the radicals generated in the polymer to favorably act on the crosslinking reaction.

Therefore, it is especially important that the atmosphere in which the active energy radiation is irradiated should be kept as an inert gas atmosphere, such as $N_2$, He, $CO_2$ etc., particularly with the oxygen concentration as low as possible, e.g. 5% at maximum.

Examples of the filler to be used together with the abovedescribed binder in the back layer of this invention include (1) graphite and carbon black having conductivity, and (2) inorganic fillers such as $SiO_2$, $TiO_2$, $Al_2O_3$, $Cr_2O_3$, SiC, $CaCO_3$, zinc oxide, geothite, $\alpha Fe_2O_3$, talc, kaolin, $CaSO_4$, boron nitride, Teflon powder, graphite fluoride, molybdenum disulfide etc. The amount of such fillers to be used is suitably 20–100 parts of (1) or 10–300 parts of (2) per 100 parts of the binder, and if the amount of the filler is too much, a disadvantage that the coat becomes brittle and rather increases dropouts will be resulted.

Examples of the magnetic tape on which such a back layer it to be applied include audio tapes, video tapes, tapes for computers, endless tapes etc., and especially the application thereof on video tapes and tapes for computers where the dropout is the most important characterstic is considerably effective.

This invention is more particularly described by the following examples.

EXAMPLE 1

| | |
|---|---|
| Carbon black, Asahi HS500 (particle diameter of 81 m$\mu$) produced by Asahi Carbon Co. | 50 parts |
| Acryl-modified vinyl chloride - vinyl acetate - vinyl alcohol copolymer (experimental product) | 30 parts |
| Acryl-modified polyurethane elastomer (experimental product) | 20 parts |
| Mixed solvent (MIBK/toluene = 1/1) | 300 parts |

The mixture of the above was dispersed in a ball mill for 5 hours, coated on the back surface of a polyester film which had been provided with a magnetic surface to a dry thickness of 3$\mu$, and cured by irradiating the back layer with electron radiation using an electron curtain type electron radiation accelerator with an acceleration voltage of 150 KeV, an electrode current of 10 mA and an absorbed dose of 10 Mrad in $N_2$ gas, after which the film was wound up, cut into a video size width of ½ inch each, and the dropouts were measured by a VHS equipment. This sample is designated Sample No. 1.

EXAMPLE 2

| | |
|---|---|
| $SiO_2$ (particle diameter of 2$\mu$) | 50 parts |
| Acryl-modified vinyl chloride - vinyl acetate - vinyl alcohol copolymer (experimental product) | 30 parts |
| Acryl-modified polyurethane elastomer (experimental product) | 20 parts |
| Mixed solvent | 300 parts |

The mixture of the above was prepared and Sample No. 2 was obtained in a similar manner as in Example 1.

EXAMPLE 3

| | |
|---|---|
| Carbon black Asahi HS500 produced by Asahi Carbon Co. | 50 parts |
| Acryl-modified polyester resin (experimental product) | 60 parts |
| Mixed solvent | 300 parts |

The mixture of the above was prepared and Sample No. 3 was obtained in a similar manner as in Example 1.

EXAMPLE 4

| | |
|---|---|
| Carbon black Asahi HS500 produced by Asahi Carbon Co. | 50 parts |
| Acryl-modified polyurethane elastomer (experimental product) | 30 parts |
| Vinyl chloride - vinyl acetate - vinyl alcohol copolymer (VAGH by U.C.C.) | 70 parts |
| Mixed solvent | 300 parts |

The mixture of the above was prepared and Sample No. 4 was obtained in a similar manner as in Example 1.

COMPARATIVE EXAMPLE 1

| | |
|---|---|
| Carbon black Asahi HS500 | 50 parts |
| Vinyl chloride - vinyl acetate - vinyl alcohol copolymer (VAGH by U.C.C.) | 30 parts |
| Polyurethane elastomer (N5033 by Nippon Polyurethane Industry) | 20 parts |
| Mixed solvent | 300 parts |

The mixture of the above was made into a paint similarly as in Example 1, and, after adding 10 parts of an isocyanate (Colonate L produced by Nippon Polyurethane Industry), coated to a dry thickness of 3μ. Thereafter, it was allowed to stand at 60° C. for 24 hours, subjected to the heat curing treatment, and cut into ½ inch each. This is designated Sample No. 5.

COMPARATIVE EXAMPLE 2

The same magnetic tape as those used in Examples and Comparative Example 1 except that the back coat had been excluded was used as Sample No. 6. This is a video tape for VHS, and made of a polyester film on which a magnetic coat has been applied.

The results of dropouts of the above samples are given in Table 1.

TABLE 1

| Sample | No. 1 | No. 2 | No. 3 | No. 4 | No. 5 | No. 6 |
|---|---|---|---|---|---|---|
| No. of Dropouts of the Sum of the Lengths of 10 Volumes of Each Sample Tape, 1/min | 10 | 8 | 12 | 15 | 25 | 13 |

15μ sec or longer
18 dB or more
20° C., 60% RH and VHS deck

As can be seen from Table 1, Sample Nos. 1–4 which have been subjected to the radiation curable treatment show remarkably less dropouts as compared with the conventional thermosetting type of No. 5.

Further, the relationships between the number of runs and the dropouts are shown in FIG. 1.

From FIG. 1, it can be seen that the tendency to increase the dropouts with the number of runs of the samples on which the back coats have been provided is much smaller that of the non-treated ones. Further, with the radiation curable treated samples, when compared with the conventional thermosetting sample, the initial low number of dropouts is well retained and a low value is recorded even after 100 times of runs.

Needless to say, the conventionally employed dispersants and lubricants may similarly be employed also in such a back layer forming method. Further, the conditions of the appearances of the wound tapes after FF running on a VHS deck are shown in Table 2.

TABLE 2

| Sample | No. 1 | No. 2 | No. 3 | No. 4 | No. 5 | No. 6 |
|---|---|---|---|---|---|---|
| Wound Condition | Excellent | Pass | Excellent | Excellent | Excellent | Poor |

From these results, those incorporating carbon black exhibit very excellent wound conditions, and that incorporating $SiO_2$ also gave better results than that having no back coat. N.B. Method for measuring the number of dropouts:

The single signal of 4 M Hz was recorded and reproduced, and the number of the signals with which the time to reduce by 18 dB or more than the average reproducing level was 15 μsec or longer was counted.

What is claimed is:

1. A magnetic recording tape having a magnetic layer on one surface of a substrate and an anti-static backing layer on the opposite surface of said substrate, said magnetic recording tape produced by a process comprising:
   (1) applying a magnetic layer on one surface of a substrate,
   (2) thereafter applying an anti-static layer, containing filler dispersed in a radiation-sensitive curable resin binder, to the opposite surface of said substrate,
   (3) irradiating said radiation-sensitive curable resin binder with active energy radiation to cure said resin binder, and
   (4) rolling said tape.

2. The magnetic recording tape according to claim 1 wherein said filler is a powder of a conductive substance such as carbon black, graphite etc.

3. The magnetic recording tape according to claim 1 wherein said filler is a powder of a highly tough material such as $SiO_2$, $TiO_2$, $Al_2O_3$, $Cr_2O_3$, SiC, $CeO_2$, $CaCO_3$, zinc oxide, geothite, $\alpha Fe_2O_3$, talc, kaolin, $CaSO_4$, boron nitride, Teflon powder, graphite fluoride, molybdenum disulfide, zirconia etc.

4. A process for producing a magnetic recording tape having a magnetic layer on one surface of a substrate and an anti-static backing layer on the opposite surface of said substrate comprising:
   (1) applying a magnetic layer on one surface of a substrate,
   (2) thereafter applying an anti-static layer, containing filler dispersed in a radiation-sensitive curable resin binder, to the opposite surface of said substrate,
   (3) irradiating said radiation-sensitive curable resin binder with active energy radiation to cure said resin binder, and 5. The process for producing a magnetic recording tape according to claim 4 wherein the filler is a powder of a conductive substance such as carbon black, graphite etc.

6. The process for producing a magnetic recording tape according to claim 4 wherein the filler is a highly tough material such as $SiO_2$, $TiO_2$, $Al_2O_3$, $Cr_2O_3$, SiC, $CeO_2$, $CaCO_3$, zinc oxide, geothite, $\alpha Fe_2O_3$, talc, kaolin, $CaSO_4$, boron nitride, Teflon powder, graphite fluoride, molybdenum disulfide, zirconia etc.

7. The process for producing a magnetic recording tape according to claim 4 which is characterized by that an electron radiation accelerator of 100–750 kV is used as the active energy radiation source and irradiation is effected in an inert gas so that the absorbed dose be 0.5–20 Mrad.

* * * * *